April 23, 1935.  A. D. OLDS  1,998,732

ELECTRIC COFFEEPOT

Filed Nov. 20, 1933

INVENTOR.
Ambrose D Olds
BY
B. F. Funk
ATTORNEY.

Patented Apr. 23, 1935

1,998,732

UNITED STATES PATENT OFFICE 1,998,732

ELECTRIC COFFEEPOT

Ambrose D. Olds, Wichita, Kans., assignor to The Coleman Lamp and Stove Company, Wichita, Kans., a corporation of Kansas Application November 20, 1933, Serial No. 698,836

9 Claims. (Cl. 219—43)

This invention relates to expansion joints for effecting a seal between a receptacle and a base where the receptacle and base have different coefficients of expansion.

Primarily, the invention is designed for use in connection with electric coffee pots in which the receptacle or bottle is made of glass, porcelain or similar material, and in which the base is made of metal or some material different from that of which the receptacle is constructed. The device is so arranged that ample provision is made for the expansion and contraction of the joint between the receptacle and the base.

Figure 1:
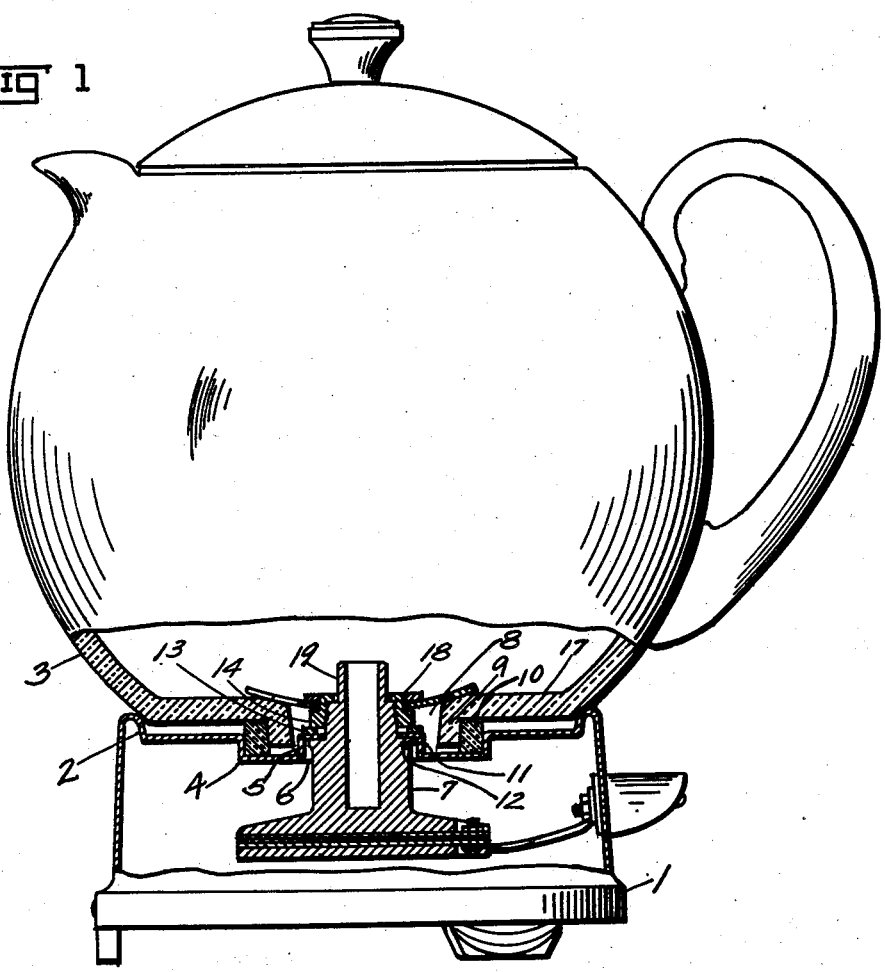
Figure 2:
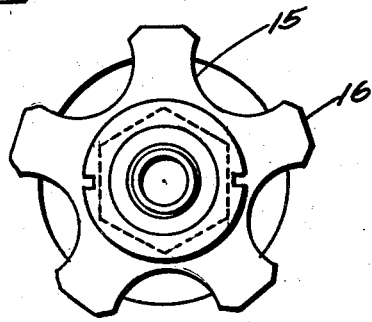

The novelty of the invention will be clearly understood by reference to the following description in connection with the accompanying drawing in which:

Figure 1 is a side elevational view of a coffee pot, the base of the joint being shown in sections, and Figure 2 is a top plan view of the clamping member of the receptacle.

Referring now to the drawing by numerals of reference: 1 designates a base having a recessed seat 2 to receive the receptacle 3. Subjacent to the seat 2 is a gasket seat 4 having an upturned flange 5, surrounding an opening 6 through which the well 7 of a percolator unit projects through an opening 8 in the receptacle 3, the opening 8 being surrounded by a depending conical flange 9 spaced from the wall of the recess 4 to accommodate a ring shaped gasket 10, of rubber or other suitable yielding material. The flange 5 has an inturned lip 11 engaging the shoulder 12 on the well 7. A gasket 13 rests on the flange and receives a nut 14 to clamp the well to the base. Above the nut 14 is a spider disc 15 in the form of a spring washer having radial arms 16 to rest upon the bottom 17 of the receptacle 3. A nut 18 on the nut 14 clamps the washer 15 to the nut 14 so that by turning the nut 14 the receptacle is drawn down against the ring-shaped gasket to compress it to form a seal between the base and the receptacle sealing off the space which it surrounds. Therefore, when the liquid in the receptacle reaches a high enough temperature to cause expansion of the receptacle, the yielding joint formed by the gasket 10 and its appurtenances, will compensate for the differences in the co-efficients of expansion between the base and the receptacle so that provision is made in a convenient manner for the differences in expansion between the receptacle and the base.

What I claim is:

1. A liquid receptacle having an opening in its bottom, surrounded by a conical flange, a base having a recessed seat, provided with a vertical wall, a yielding ring-shaped gasket on the seat between the wall of the seat and the flange, and a yielding clamping means to compress the gasket between the receptacle and the base to expand the gasket laterally to provide a seal.

2. A liquid receptacle having an opening in its bottom, surrounded by a flange, a base having a seat with a vertical wall spaced from the flange, a ring shaped gasket in the seat surrounding the flange, said gasket having upward converging sides and yielding means for drawing the receptacle down on the gasket to expand it laterally against the flange and the side wall.

3. A liquid receptacle having an opening in its bottom, surrounded by a depending flange, a base having a top recess forming a seat with a side wall spaced from its flange, a yielding gasket surrounding the flange, resting upon the seat, a clamping member extending upwardly from the seat and through the opening and a yielding clamping member adjustable on the first named clamping member, to clamp the receptacle against the gasket to expand it laterally.

4. In a device of the class described, a base having a seat with a side wall, a yielding ring shaped gasket on the seat, a receptacle having a depending flange overlapping the gasket, and a yielding means for clamping the base and the receptacle together to expand the gasket laterally.

5. In a device of the class described, a base having a seat provided with side wall, a receptacle having an opening in its bottom, surrounded by a flange, a percolator well unit carried by the base extending through the opening in the receptacle, a yielding gasket between the receptacle and the base surrounding the opening and compressible between the wall of the seat and the flange, and a yielding means for clamping the receptacle, the gasket and the base together to form a seal, said means being connected to the percolator well unit.

6. A liquid receptacle having an opening in its bottom, having a seat, a yielding gasket surrounding the opening and resting upon the seat, an upstanding member on the base projecting through the opening and a spring clamping member on the upstanding member having radial fingers resting upon the bottom of the receptacle to clamp it against the gasket and to compensate for inequalities in the bottom of the receptacle resting upon the gasket.

7. A liquid receptacle having an opening in its bottom, a base having a seat, a yielding gasket surrounding the opening and resting upon the seat, an upstanding member on the base projecting through the opening and a spring clamping member on the upstanding member having radial fingers resting upon the bottom of the receptacle to clamp it against the gasket and to compensate for inequalities in the bottom of the receptacle resting upon the gasket and a nut threaded on the upstanding member bearing against the spring clamping member to hold the spring clamping member in place.

8. A liquid receptacle having an opening in its bottom surrounded by depending flange, a base having a top recess forming a seat with a side wall spaced from the flange to provide a gasket receiving space, a yielding gasket in the space resting upon the seat, an upstanding member extending from the seat through the opening and a yielding clamping member adjustable on the upstanding member overlapping the bottom of the receptacle surrounding the opening to compensate for inequalities in the bottom of the receptacle resting upon the gasket and effective to expand the gasket laterally in the space to form a seal.

9. In a device of the class described a base, a yielding ring shaped gasket on the base, a receptacle having a different coefficient of expansion than the base and provided with an opening in its bottom, a flange surrounding the opening projecting into and lying against the inner wall of the gasket and means for clamping the base and receptacle to the gasket to form a seal.

AMBROSE D. OLDS.